(12) United States Patent
Zengerle et al.

(10) Patent No.: US 11,669,357 B2
(45) Date of Patent: Jun. 6, 2023

(54) INTEGRATION AND DEVELOPMENT CYCLES BY SWAPPING RUNNING EXECUTABLES IN CLOUD-NATIVE ENVIRONMENTS

(71) Applicant: SAP SE, Walldorf (DE)

(72) Inventors: Jonas Zengerle, Bockenheim an der Weinstr. (DE); Patrick Spiegel, Karlsruhe (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 16/818,595

(22) Filed: Mar. 13, 2020

(65) Prior Publication Data

US 2021/0286640 A1 Sep. 16, 2021

(51) Int. Cl.
*G06F 9/455* (2018.01)
*G06F 16/17* (2019.01)
*G06F 9/445* (2018.01)
*G06F 8/65* (2018.01)

(52) U.S. Cl.
CPC ........... *G06F 9/45558* (2013.01); *G06F 8/65* (2013.01); *G06F 9/44505* (2013.01); *G06F 16/1734* (2019.01); *G06F 2009/45562* (2013.01); *G06F 2009/45595* (2013.01)

(58) Field of Classification Search
None
See application file for complete search history.

(56) References Cited

U.S. PATENT DOCUMENTS

| 2008/0162674 | A1* | 7/2008 | Dahiya | G06F 8/656 709/221 |
|---|---|---|---|---|
| 2019/0199687 | A1* | 6/2019 | Lan | G06F 21/53 |
| 2019/0236301 | A1 | 8/2019 | Spiegel et al. | |
| 2020/0241864 | A1* | 7/2020 | Duvur | G06F 8/65 |
| 2021/0255846 | A1* | 8/2021 | Mamgain | H04L 67/34 |
| 2021/0279111 | A1* | 9/2021 | Ranjan | G06F 8/65 |

OTHER PUBLICATIONS

Blog.Phusion.nl[Online], "'Docker and the PID 1 zombie reaping problem'" Jan. 20, 2015, [retrieved on Mar. 16, 2020], retrieved from : URL <https://blog.phusion.nl/2015/01/20/docker-and-the-pid-1-zombie-reaping-problem/>, 17 pages.

(Continued)

*Primary Examiner* — Lewis A Bullock, Jr.
*Assistant Examiner* — Melissa A Headly
(74) *Attorney, Agent, or Firm* — Fish & Richardson P.C.

(57) ABSTRACT

Methods and systems can be used for swapping running executables in a container. A container orchestrator process receives a request to run an application in a container. A first execution of the application is initiated, in the container, in a first child process of the container orchestrator process. The container orchestrator process listens for file changes for the application. At least one file change is determined for the application, and in response to determining the at least one file change for the application, a second execution of the application is initiated in the container, without restarting the container, using the at least one file change, in a second child process of the container orchestration process. After initiating the second execution of the application in the container, the first child process is terminated.

20 Claims, 5 Drawing Sheets

(56) References Cited

OTHER PUBLICATIONS

CloudFoundry.Org [Online], "Container Runtime" Apr. 10, 2017, [retrieved on Mar. 16, 2020] retrieved from : URL <https://www.cloudfoundry.org/containers/>, 5 pages.
Code.Visualstudio.com [Online], ""VS Code Remote Development"" May 2, 2019, [retrieved on Mar. 16, 2020], retrieved from : URL <https://code.visualstudio.com/docs/remote/remote-overview>, 3 pages.
Code.VisualStudio.com[Online], ""Remote Development with VS Code"" May 2, 2019, [retrieved on Mar. 16, 2020], retrieved from : URL <https://code.visualstudio.com/blogs/2019/05/02/remote-development>, 10 pages.
Docs.Cloudfoundry.org[Online], ""Accessing Apps with SSH"" May 1, 2013, [retrieved on Mar. 16, 2020], retrieved from : URL <https://docs.cloudfoundry.org/devguide/deploy-apps/ssh-apps.html>, 5 pages.
IBM.com [Online], ""The 6 steps of the container lifecycle"" Feb. 8, 2016, [retrieved on Mar. 16, 2020] retrieved from : URL <https://www.ibm.com/blogs/cloud-computing/2016/02/08/the-6-steps-of-the-container-lifecycle/>, 8 pages.
Itnext.Io [Online], ""Introducing kubectl warp—live develop code in Kubernetesl!"" Jan. 1, 2019, [retrieved on Mar. 16, 2020], retrieved from : URL <https://itnext.io/introducing-kubectl-warp-live-develop-code-in-kubernetes-9846c16d4bec>, 6 pages.
Kuberentes.io [Online}, ""What is Kubernetes https://kubernetes.io/docs/concepts/overview/what-is-kubernetes/"" Apr. 1, 2017, [retrieved on Mar. 16, 2020], retrieved from : URL <https://kubernetes.io/docs/concepts/overview/what-is-kubernetes/>, 8 pages.
Kubemetesio.com[Online], ""Kubernetes Docs—kubectl cp"" Dec. 27, 2017, [retrieved on Mar. 16, 2020], retrieved from : URL <https://kubernetes.io/docs/reference/generated/kubectl/kubectl-commands#cp>,103 pages.
MartinFowler.com [Online], ""Howto break a Monolith into Microservices"" Apr. 24, 2018, [retrieved on Mar. 16, 2020], retrieved from : URL <https://martinfowler.com/articles/break-monolith-into-microservices.html>, 14 pages.
Openshift.com/[Online], "Openshift—Container Application Platform" Jun. 28, 2002, [retrieved onMar. 16, 2020], retrieved from : URL <https://www.openshift.com/>, 5 pages.
Telepresence.io [Online], "Fast, Local Development for Kubernetes and Openshift Microservices", Apr. 24, 2017, [retrieved on Mar. 16, 2020], retrieved from : URL <https://www.telepresence.io/>, 5 pages.
U.S. Appl. No. 16/585,655, Spiegel et al., Security Headers for Cloud-Native Applications, filed Sep. 27, 2019, 37 pages.

* cited by examiner

INTEGRATION AND DEVELOPMENT CYCLES BY SWAPPING RUNNING EXECUTABLES IN CLOUD-NATIVE ENVIRONMENTS

BACKGROUND

A container can be used by a host machine to provide virtual separation of processes, memory, file space, and network connections. Containers can be used to package and deliver software, database, or other artifacts. Separate components (for example, applications or database tenants) can have separate containers. Containers can provide component self-containment, separation and independence.

SUMMARY

The present disclosure describes swapping running executables in a container. In an implementation, a computer-implemented method includes receiving, by a container orchestrator process, a request to run an application in a container. A first execution of the application is initiated, in the container, in a first child process of the container orchestrator process. The container orchestrator process listens for file changes for the application. At least one file change is determined for the application. In response to determining the at least one file change for the application, a second execution of the application is initiated in the container, without restarting the container, using the at least one file change, in a second child process of the container orchestration process. After initiating the second execution of the application in the container, the first child process is terminated.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a reduction of integration test steps can occur when testing a new deployment of a microservice. Second, a new version of a microservice can be deployed without downtime for the microservice. Third, integration testing time can be reduced. Fourth, feedback from integration testing can be received more quickly than for deployments that result in container upgrades. Fifth, a new file for a microservice can be transferred into and used by a running container. Sixth, a change to a microservice can be deployed without restarting a container. Seventh, changes can be deployed for a microservice without a need to create a new container image. Eighth, a new executable can be deployed for a container with less overhead costs than when a container is replaced. Ninth, a new version of a microservice can be deployed while keeping the microservice continually available for integration testing. Tenth, a microservice can be deployed without installing additional components to an integration environment. Eleventh, an integration environment, without a need for additional components, can be configured to mirror a production environment. Twelfth, an improved microservice deployment approach can be used in multiple types of programming environments.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1A:
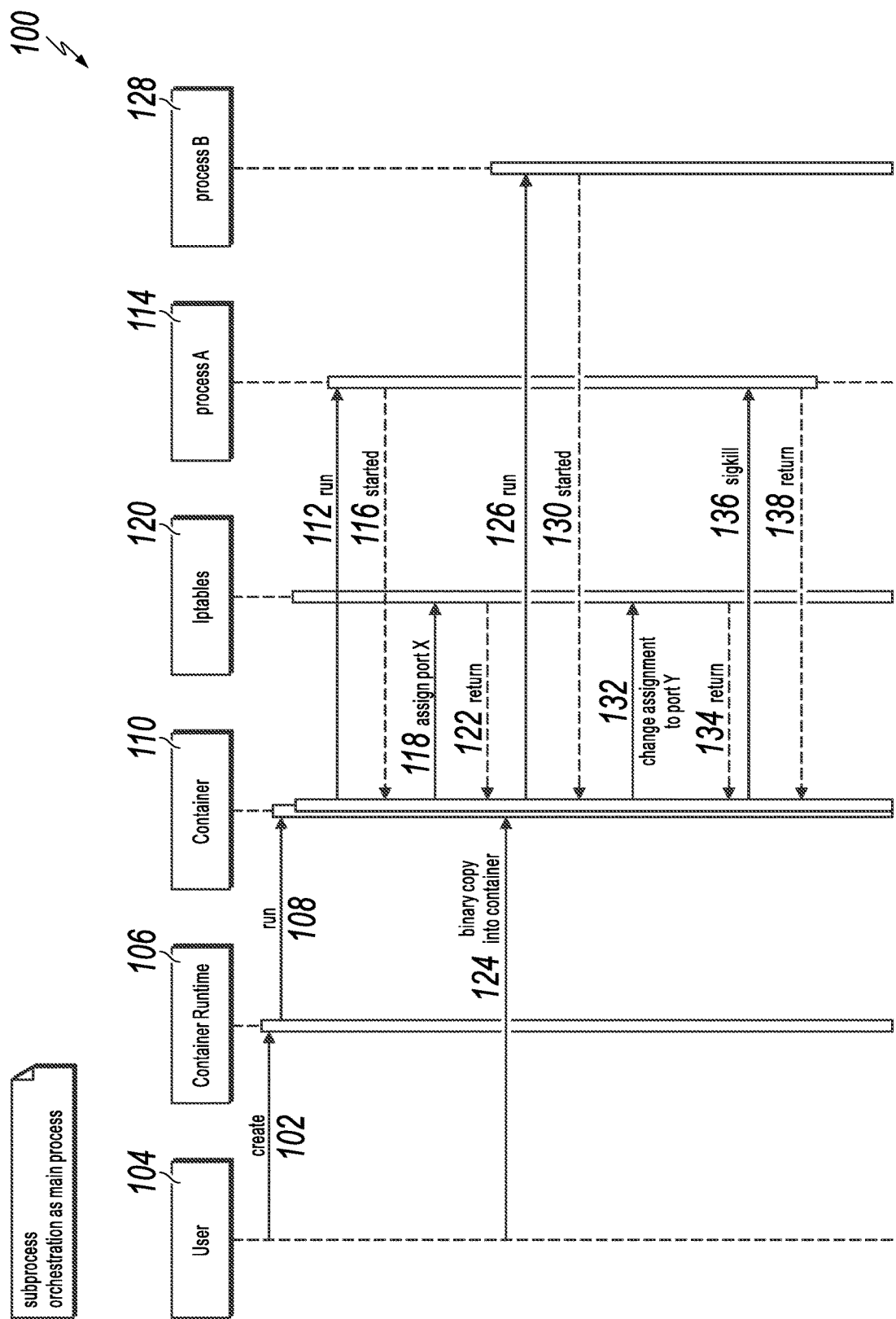
FIG. 1A is a swim lane diagram illustrating an example of a computer-implemented method for swapping running executables in a container, according to an implementation of the present disclosure.

The following detailed description describes swapping running executables in a container, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

With microservice solutions, a software solution that previously was delivered as a monolith system can be delivered as a set of cooperating microservices. Each microservice can be delivered using a container. A container can be used for service packaging, self-containment, isolation, and independence. A single-binary monolith approach can be replaced by multiple, interacting services each included in a container image managed by the cloud platform. The move from monolith applications to microservices can bring many advantages in terms of modularity and scalability, but can also come with new challenges, such as testing the multiple, different microservices.

In a monolith system, a single binary of the monolith system can be tested, for example, in an integration test phase. When moving from monolithic applications to containerized microservices, different approaches can be used for developing, testing, and integrating microservice code. While a monolith application can be built and tested as one application, a separation into multiple microservices can increase an importance of comprehensive integration testing. In an integration environment, changes can be deployed to various different services in a cluster of services. Services in the cluster can use other services, and when testing one service a number of other services may be called. Accordingly, having each service remain available during integration testing can be important. However, in an integration testing environment, changes to different microservices may need to be deployed.

In prior microservice architecture systems, a change to a microservice can result in a variety of tasks to be performed to test and deploy the change. For instance, a binary may need to be regenerated and added to a container or a static file may need to be added to the container. A new container image may need to be generated and pushed to a container registry. The microservice cluster/architecture may need to download the new image and restart a container. Finally, the updated microservice in the updated container can be tested.

Integration testing of microservices can be time consuming when multiple tasks are done for each change to any microservice. Additionally, a microservice for which the previously-described upgrade tasks are performed may have a certain downtime period in which the microservice is unavailable to participate in integration testing. Accordingly, integration testing cycles can be slowed, resulting in a longer time to receive feedback/verification related to microservice change(s), as compared to an improved approach.

For instance, with an improved approach for deploying a change to a microservice, a new file (for example, a newly built binary file or a new static file) can be inserted into an existing running container, without restarting the container. A container process can use the new file, and changes can be deployed as part of a zero downtime deployment process. The container does not need to be restarted, nor does a new container image need to be generated, deployed, or downloaded. Accordingly, faster test cycles, such as integration test, can be performed.

In general, integration and development cycle length can be reduced by swapping running binaries in cloud-native environments. For instance, an orchestrator process can watch for changes and replace an active application process with a new application process, while the container keeps running. Replacing an active process can be referred to as a hot swap. A hot swap of updating the contents of a continuously running container instead of updating the entire container can reduce overhead costs. For example, copying changes into a container and starting a new process can generally be performed multiple times faster than building, pushing and pulling new container images.

The improved approach can offer multiple advantages, including a zero-downtime solution for a microservice undergoing an upgrade. For example, dynamic port routing within a container can be performed to achieve zero-downtime updates for the microservice. From a perspective of an external microservice that uses the microservice being updated, the microservice being updated can be continuously available.

Ensuring that a given microservice is continuously available can be important, for not disturbing or delaying integration testing activities. In contrast, other approaches that involve a container restart can result in microservice unavailability. Continuous microservice availability can ensure a stable environment for fast integration cycles so that microservice developers and testers can receive fast, direct feedback for microservice code changes.

In addition to shorter integration cycles, the improved approach can provide a production-like test and integration environment that includes minimized modifications in comparison to a production landscape in terms of components and component interaction. For instance, a non-invasive approach can include minimal modifications that are integrated into a production-like landscape, rather than relying on addition of components into the platform or other activities such as network manipulation. For example, real, rather than artificially generated/manipulated, network traffic can be used for test and integration purposes. As another example, by leveraging process handling within a current container as a lightweight one-time configuration, there is no (or a reduced) need for further components running on the platform.

In contrast, other approaches can involve installation of additional components to an integration environment that are not included in a production environment, such additional containers or proxies. For instance, other approaches can include additional components that intervene networking and route traffic to a local or special test container. Use of additional components or network tampering can affect and influence microservice behavior in the integration environment to not match behavior that would have occurred in the production environment, due, for example, to changes in network load, memory usage, processor load, or storage usage. Having an integration environment that differs significantly from the product environment can be undesirable. An integration environment that differs from production can result in a false negative (for instance, a reporting of a test error that is caused by environmental factors rather than microservice implementation) or a false positive (for instance, a correct result for a test that should have failed, but didn't due to environmental changes or conditions that do not reflect a production environment).

As another advantage, the improved approach can be used with different environments. For example, platform-native tools, such as a secure copy feature, can be used. Particular programming languages, IDEs (Integrated Development Environments), extensions, or repositories are not required. Other approaches for microservice upgrades or testing are specific to particular programming languages, IDEs or other tools. The improved approach is runtime-agnostic in terms of tools used, thereby providing a flexible development environment.

FIG. 1A is a swim lane diagram illustrating an example of a computer-implemented method 100 for swapping running executables in a container, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, a user 104 creates a binary for execution by a container runtime 106 and provides the binary to the container runtime 106. From 102, method 100 proceeds to 108.

At 108, the container runtime 106 executes the binary in a container 110. From 108, method 100 proceeds to 112.

At 112, a main process of the container 110 initiates a process A 114.

Figure 1B:
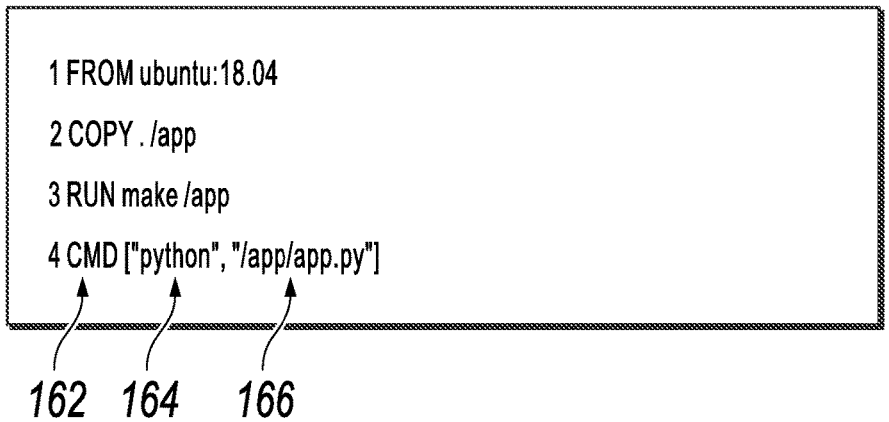
FIGS. 1B-1D illustrate examples of code listings, according to an implementation of the present disclosure.

In some previous environments, an application binary is executed as a container's main process, as shown in line 4 of a code listing 160 illustrated in FIG. 1A. However, in the present disclosure, an orchestrator process is configured as the container's main process, as shown in line 4 of a code listing 170 illustrated in FIG. 1B and described in following paragraphs.

If a container would be configured as shown in FIG. 1A, a CMD command 162 would execute a "python" command 164 with an application (microservice) reference 166 as a parameter. The python command 164 (and its parameter 166) would be configured as a main process for the container. However, to deploy a new application process in this example, the python command 164 would need to be stopped, and restarted with a new parameter for a new application executable. When a main process is halted, the container hosting the main process is destroyed. Such an approach would suffer from previously-described disadvantages of microservice downtime, and multiple deployment steps of generating and redeploying a new container.

Figure 1C:
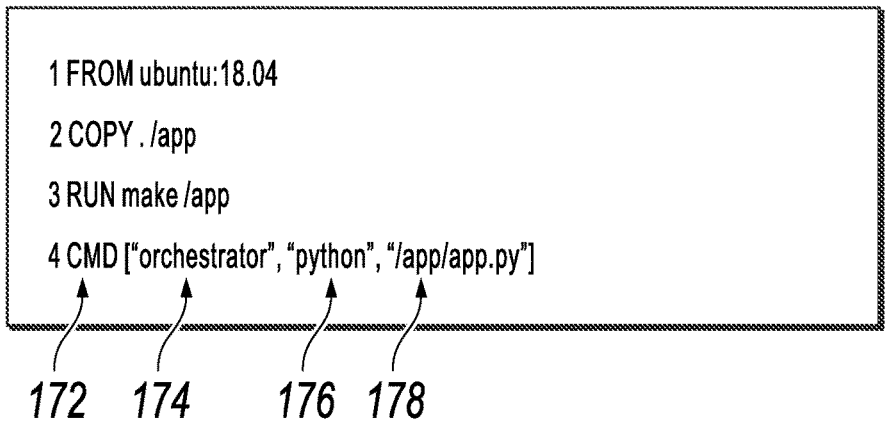

For the present disclosure, when executing steps 108 and 112, an orchestrator command is used, as shown in line 4 of the listing 170 in FIG. 1C. A CMD command 172 executes an orchestrator command 174 (rather than directly executing the application). The orchestrator command 174 is a proxy command that wraps execution (both initial and restart) of an application process. The orchestrator command 174, when executed as a main process for the container, initiates execution of a python command 176 with an application reference 178 as a parameter. Execution of the python command 176 results in execution of the application (microservice), as a new sub process of the orchestrator command 174. Indirect execution of the application can provide a benefit of the orchestrator command 174 continuing to run even when application binaries or executables are updated. If a current application process is ended when switching to a new application process, the container is maintained because the orchestrator process is running as the main container process, instead of an application process. From 112, method 100 proceeds to 116.

At 116, the process A 114 provides a started status to the main process of the container 110. From 116, method 100 proceeds to 118.

At 118, the main process of the container 110 assigns a port X in IP tables 120 to the process A. In some implementations, an external port (for example port 8000) is mapped to the application. When the application is started, the running application can be assigned an internal port (for example, port 80). The external port 8000 can be mapped to the internal port 80, so that external requests for the application are routed to the running application. From 118, method 100 proceeds to 122.

At 122, a status is returned from the IP tables assignment. From 122, method 100 proceeds to 124.

At 124, the user 104 copies a new binary into the container 110. The user 104 can use a secure copy feature to copy the new binary, for example. The secure copy feature can enable copying files into a running container over a secure connection, for example. An authorization check can be performed for the user 104 to ensure that the user 104 is authorized to update the binary. A particular location (folder) can be configured for receiving a new binary (or other executable file). From 124, method 100 proceeds to 126.

At 126, the main process of the container 110 initiates execution of a process B 128. The process B can correspond to a restarting of the application using the new binary. The orchestrator command can detect the new binary, and initiate process B to run the new binary, in response to detecting the new binary. Process B can be initiated as a sub process of the orchestrator command. From 126, method 100 proceeds to 130.

At 130, the process B provides a started status to the main process of container 110. From 130, method 100 proceeds to 132.

At 132, the main process of the container 110 changes assignment to port Y in the IP tables 120. For instance, the process B can be assigned to a different internal port than the process A. For example, the process B can be assigned to an internal port 81. The previously-discussed external port can be mapped to the internal port 81 instead of the previously-mapped internal port 80. Remapping ports can be performed with no discernable downtime from outside the container. Application requests can be routed to the new process B, and uses of the application/microservice can perceive no disruption in the application/microservice availability. From 132, method 100 proceeds to 134.

At 134, a status is returned from the IP tables assignment. From 134, method 100 proceeds to 136.

At 136, a kill signal is sent by the main process of the container 110 to the process A 114. The orchestrator can kill the old process A running an old instance of the application, once the new instance of the binary is running. With port reassignment, the external port (for example, 8000) is no longer mapped to the process A, so no application requests are being handled by the process A when the process A is terminated. New application requests are being handled by the process B. From 136, method 100 proceeds to 138.

At 138, a confirmation of receipt of the kill signal is sent by the process A (or by a kernel service) to the main process of the container 100, confirming that the process A has been (or will be) killed. After 138, method 100 can stop.

Figure 2:
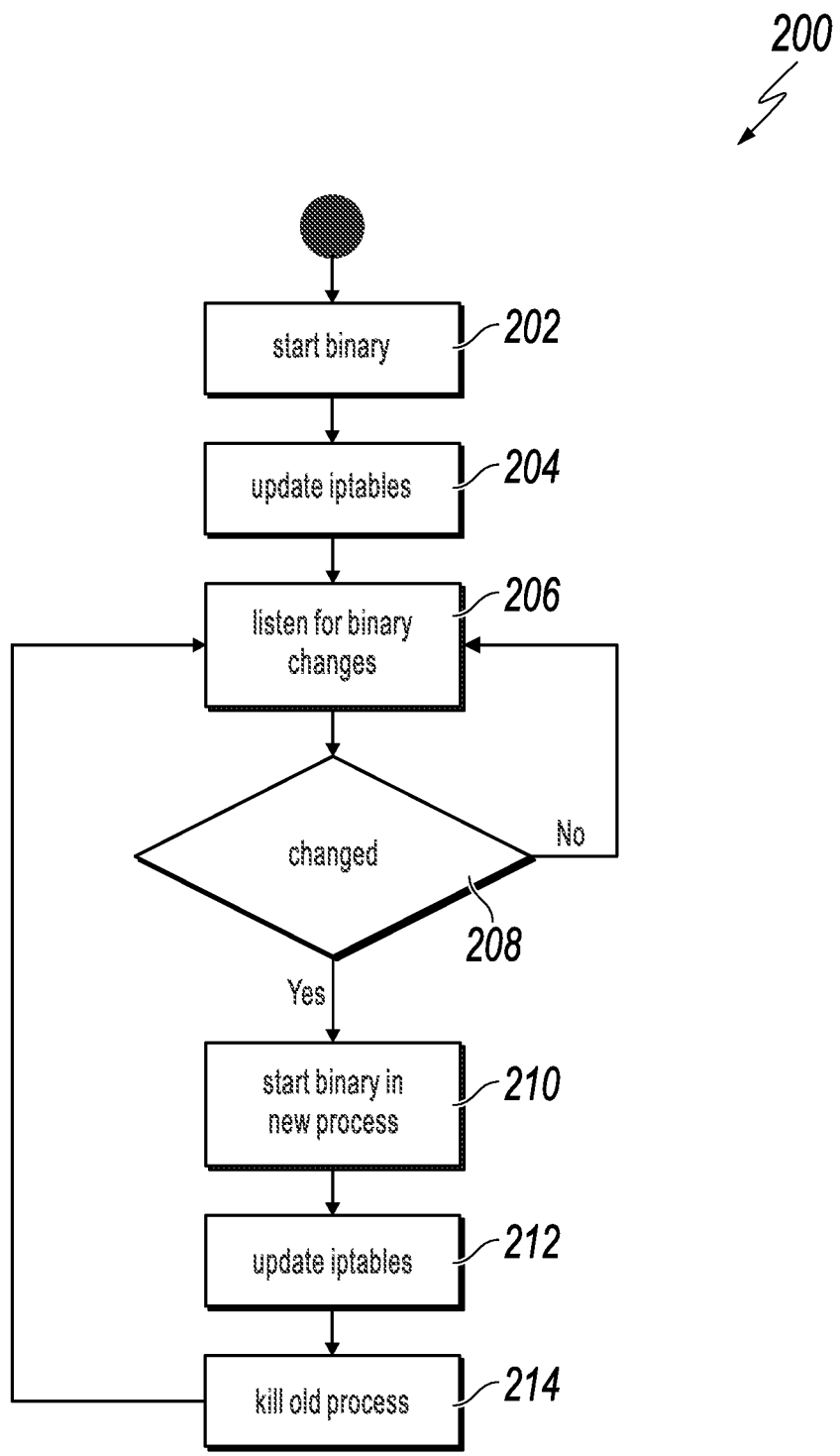
FIG. 2 is a flowchart illustrating an example of a computer-implemented method for updating a running microservice without service downtime, according to an implementation of the present disclosure.

FIG. 2 is a flowchart illustrating an example of a computer-implemented method 200 for updating a running microservice without service downtime, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a binary is started. For example, as previously-discussed, an orchestrator process can start a binary for an application/microservice. From 202, method 200 proceeds to 204.

At 204, IP tables are updated. For example, the binary can be assigned to a first internal port and an external port can be mapped to the first internal port. From 204, method 200 proceeds to 206.

At 206, binary changes are listened for. For example, the orchestrator process can listen for binary changes. In other examples, additionally or alternatively, the orchestrator can listen for changes to one or more static (for example, configuration) files. In summary, the orchestrator can listen for, among others, changes on a configured binary (for compiled languages), file (for virtual machine based languages), or a directory (for interpreted languages).

The orchestrator can be configured with a path to a certain file or directory for which the orchestrator is to watch for changes. The orchestrator can detect a change in the certain file or within the certain directory. A user wanting to restart an application or microservice can copy new or modified artifacts into the container under a path where the orchestrator listens to changes. The path where the orchestrator listens for changes can be a same or a different path at which a current binary is executing.

Figure 1D:
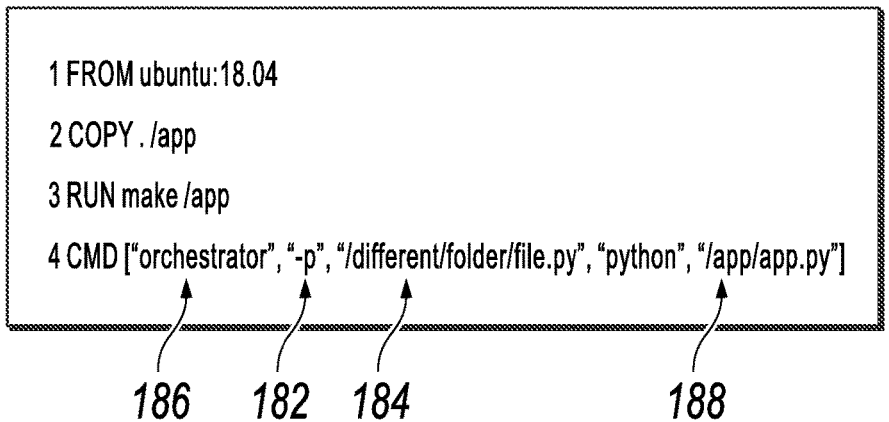

For instance, as shown in FIG. 1D, a line 4 of a listing 180 includes an option 182 and an option parameter 184 that are used by an orchestrator command 186. The option parameter 184 specifies a directory at which to listen for file changes. The directory in the option parameter 184 is a different directory than a directory 188 used for an application executable. When the application directory and the new/modified file directory are different, the orchestrator can copy a new/modified file into the application directory when restarting the application. Although command parameters are described, in other examples, a directory at which to listen for changes is specified in a configuration file within the container. From 206, method 200 proceeds to 208.

At 208, a determination is made as to whether a change has occurred. A change can be to a file or directory for which the orchestrator is listening for changes. If it is determined that a change has occurred, method 200 proceeds to 210. Otherwise, if it is determined that a change has not occurred, method 200 returns to 206.

At 210, the binary is started in a new process. For example, the new process can be started as a sub process of the orchestrator process. From 210, method 200 proceeds to 212.

At 212, IP tables are updated. For example, the new process can be assigned to a second internal port. The external port can be remapped to the second internal port, rather than to the first internal port. Accordingly, the application can have a zero-downtime update. From 212, method 200 proceeds to 214.

At 214, the old process is killed. The killing of the old process does not result in termination of the container, since the old process is a child process of the main orchestrator process and is not itself the main container process. From 214, method 200 returns to 206, for continued listening for binary changes. If a stopping condition is detected, method 200 can stop.

Although use of dynamic port routing is described, in some implementations, process orchestration occurs without dynamic port routing. For example, a single external port can be used for the application, without use of multiple internal ports. However, only one process may be able to bind to the external port at a time. The orchestrator process can stop a current child process to free the external port for assignment, start a new process to run the updated microservice, and bind the new process to the external port. However, using one external port and reassigning the external port to the new process can incur some downtime for the microservice while the new process is being started. In implementations or situations where a small amount of downtime is acceptable, the single port solution can be used.

Other options can be included with or for the orchestrator process. For example, in some implementations, the orchestrator process can run a compile command when a new compilable file is detected, and then run a new instance of an executable file created from the compilation, in a new process. As another example, although integration environments are described, in some implementations, at least a part of process orchestration previously described can occur in a production environment. In some implementations, when dynamic port routing is used for a container, the container is configured with automatically-loaded kernel modules. For instance, the container can be configured with a particular administrative capability (for example, NET_ADMIN in some environments).

Figure 3:
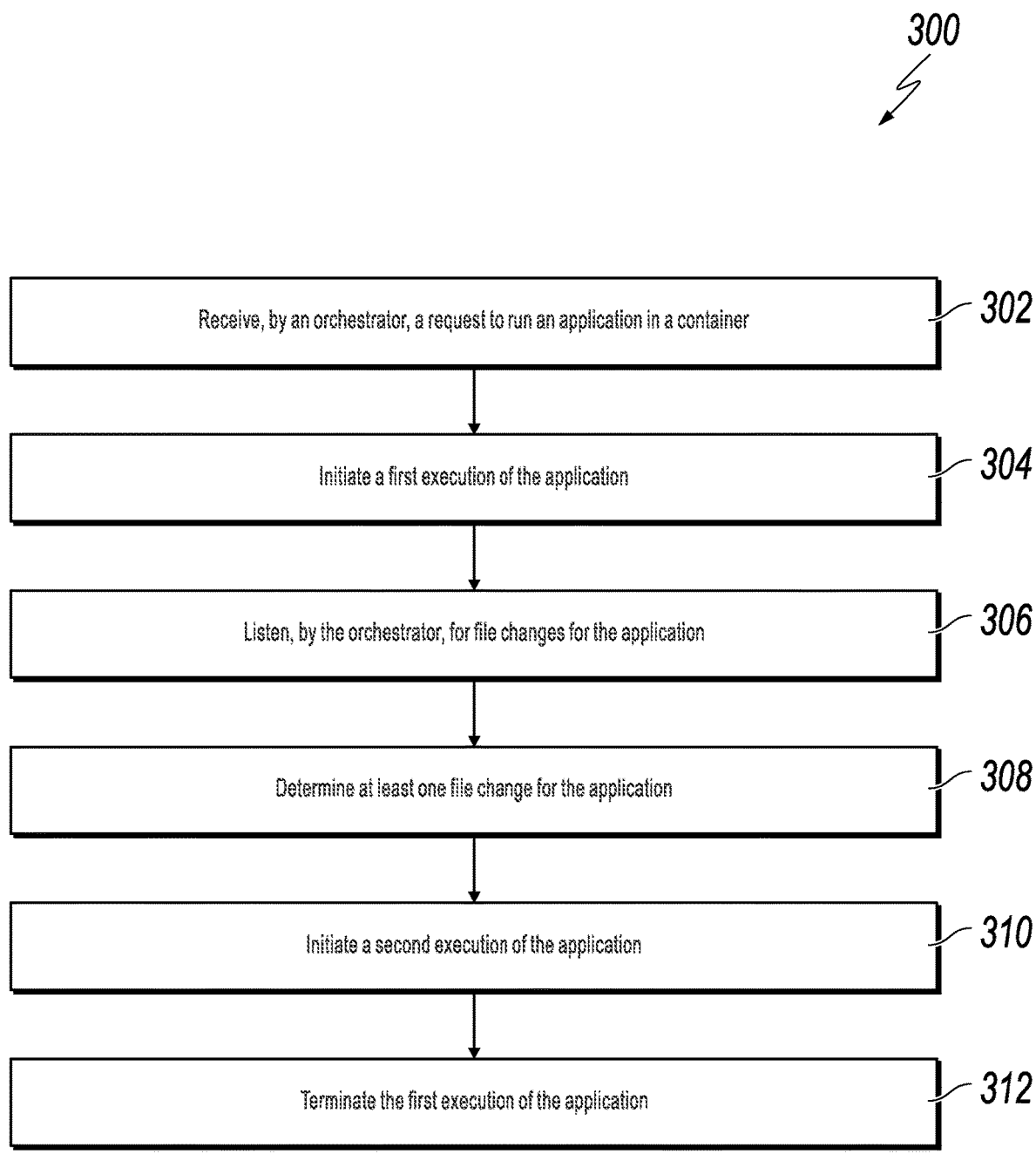
FIG. 3 is a flowchart illustrating an example of a computer-implemented method for swapping running executables, according to an implementation of the present disclosure.

FIG. 3 is a flowchart illustrating an example of a computer-implemented method 300 for swapping running executables, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a request to run an application in a container is received, by a container orchestrator process. From 302, method 300 proceeds to 304.

At 304, a first execution of the application, is initiated, in the container, in a first child process of the container orchestrator process. Initiating the first execution of the application can include assigning the first child process to a first internal port and mapping an external port to the first internal port. From 304, method 300 proceeds to 306.

At 306, the container orchestrator process listens for file changes for the application. From 306, method 300 proceeds to 308.

At 308, at least one file change is determined for the application. A file change can be a new version of a binary executable file for the application. The request to run the application can include a location of the binary executable file or a location at which to listen for file changes. The location at which to listen for file changes can be different than the location of the binary executable file. A file change can be a new or updated configuration file used by the application. A file change can correspond to a secure copying or a file into the container during the first execution of the application. From 308, method 300 proceeds to 310.

At 310, in response to determining the at least one file change for the application, a second execution of the application is initiated in the container, without restarting the container, using the at least one file change, in a second child process of the container orchestration process. Initiating the second execution of the application can include assigning the second child process to a second internal port and mapping the external port to the second internal port. From 310, method 300 proceeds to 312.

At 312, after initiating the second execution of the application in the container, the first child process is terminated, ending the first execution of the application. After 312, method 300 can stop. In some implementations, however, method 300 continues, at 306, for further listening for other file changes for the application. A new file change can be detected, and a third execution of the application can be initiated, for example, as a third child process of the container orchestration process, and execution of the second child process can be halted.

Figure 4:
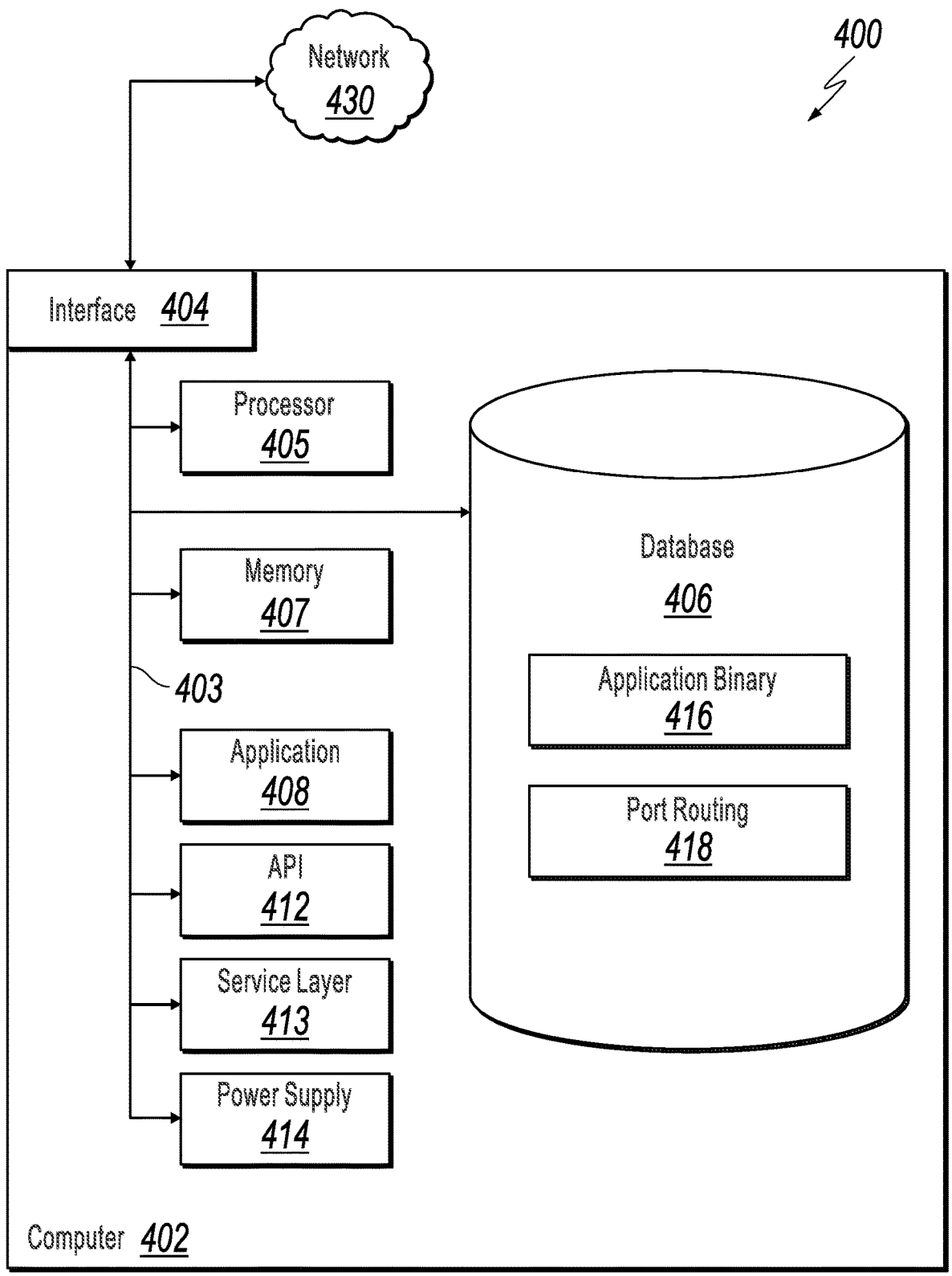
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described application binary 416 and port routing (IP tables) 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method comprises: receiving, by a container orchestrator process, a request to run an application in a container; initiating a first execution of the application, in the container, in a first child process of the container orchestrator process; listening, by the container orchestrator process, for file changes for the application; determining at least one file change for the application; in response to determining the at least one file change for the application, initiating a second execution of the application in the container, without restarting the container, using the at least one file change, in a second child process of the container orchestration process; and after initiating the second execution of the application in the container, terminating the first child process.

The foregoing and other described implementations can each, optionally, include one or more of the following features:

A first feature, combinable with any of the following features, wherein initiating the first execution of the application includes assigning the first child process to a first internal port and mapping an external port to the first internal port; and initiating the second execution of the application includes assigning the second child process to a second internal port and mapping the external port to the second internal port.

A second feature, combinable with any of the previous or following features, wherein the at least one file change includes a new version of a binary executable file for the application.

A third feature, combinable with any of the previous or following features, wherein the request includes a location of the binary executable file A fourth feature, combinable with any of the previous or following features, wherein the request includes a location at which to listen for file changes A fifth feature, combinable with any of the previous or following features, wherein the location at which to listen for file changes is different than the location of the binary executable file.

A sixth feature, combinable with any of the previous or following features, wherein the at least one file change includes a new or updated configuration file used by the application.

A seventh feature, combinable with any of the previous or following features, wherein a first file change corresponds to a secure copying of a first file into the container during the first execution of the application.

In a second implementation, a non-transitory, computer-readable medium stores one or more instructions executable by a computer system to perform operations comprising: receiving, by a container orchestrator process, a request to run an application in a container; initiating a first execution of the application, in the container, in a first child process of the container orchestrator process; listening, by the container orchestrator process, for file changes for the application; determining at least one file change for the application; in response to determining the at least one file change for the application, initiating a second execution of the application in the container, without restarting the container, using the at least one file change, in a second child process of the container orchestration process; and after initiating the second execution of the application in the container, terminating the first child process.

The foregoing and other described implementations can each, optionally, include one or more of the following features:

A first feature, combinable with any of the following features, wherein initiating the first execution of the application includes assigning the first child process to a first internal port and mapping an external port to the first internal port; and initiating the second execution of the application includes assigning the second child process to a second internal port and mapping the external port to the second internal port.

A second feature, combinable with any of the previous or following features, wherein the at least one file change includes a new version of a binary executable file for the application.

A third feature, combinable with any of the previous or following features, wherein the request includes a location of the binary executable file A fourth feature, combinable with any of the previous or following features, wherein the request includes a location at which to listen for file changes A fifth feature, combinable with any of the previous or following features, wherein the location at which to listen for file changes is different than the location of the binary executable file.

A sixth feature, combinable with any of the previous or following features, wherein the at least one file change includes a new or updated configuration file used by the application.

A seventh feature, combinable with any of the previous or following features, wherein a first file change corresponds to a secure copying of a first file into the container during the first execution of the application.

In a third implementation, a computer-implemented system comprises one or more computers and one or more memory devices interoperably coupled with the one or more computers and having tangible, non-transitory, machine-readable media storing one or more instructions that, when executed by the one or more computers, perform one or more operations comprising: receiving, by a container orchestrator process, a request to run an application in a container; initiating a first execution of the application, in the container, in a first child process of the container orchestrator process; listening, by the container orchestrator process, for file changes for the application; determining at least one file change for the application; in response to determining the at least one file change for the application, initiating a second execution of the application in the container, without restarting the container, using the at least one file change, in a second child process of the container orchestration process; and after initiating the second execution of the application in the container, terminating the first child process.

The foregoing and other described implementations can each, optionally, include one or more of the following features:

A first feature, combinable with any of the following features, wherein initiating the first execution of the application includes assigning the first child process to a first internal port and mapping an external port to the first internal port; and initiating the second execution of the application includes assigning the second child process to a second internal port and mapping the external port to the second internal port.

A second feature, combinable with any of the previous or following features, wherein the at least one file change includes a new version of a binary executable file for the application.

A third feature, combinable with any of the previous or following features, wherein the request includes a location of the binary executable file A fourth feature, combinable with any of the previous or following features, wherein the request includes a location at which to listen for file changes A fifth feature, combinable with any of the previous or following features, wherein the location at which to listen for file changes is different than the location of the binary executable file.

A sixth feature, combinable with any of the previous or following features, wherein the at least one file change includes a new or updated configuration file used by the application.

A seventh feature, combinable with any of the previous or following features, wherein a first file change corresponds to a secure copying of a first file into the container during the first execution of the application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a container orchestrator process, a request to run an application in a container, wherein the container orchestrator process is a main process of the container;
   initiating, using an orchestrator proxy command and an application reference to the application, a first execution of the application, in the container, and as a first child process of the container orchestrator process;
   listening, by the container orchestrator process, for file changes for the application;
   determining at least one file change for the application;
   in response to determining the at least one file change for the application, initiating, using the orchestrator proxy command and the application reference to the application, a second execution of the application in the container, without restarting the container, using the at least one file change, and as a second child process of the container orchestration process, wherein the second child process is a different child process of the container orchestrator process than the first child process, wherein the container orchestrator process continues to execute during the file change; and
   after initiating the second execution of the application in the container, terminating the first child process.

2. The computer-implemented method of claim 1, wherein:
   initiating the first execution of the application includes assigning the first child process to a first internal port and mapping an external port to the first internal port; and
   initiating the second execution of the application includes assigning the second child process to a second internal port and mapping the external port to the second internal port.

3. The computer-implemented method of claim 1, wherein the at least one file change includes a new version of a binary executable file for the application.

4. The computer-implemented method of claim 3, wherein the request includes a location of the binary executable file.

5. The computer-implemented method of claim 4, wherein the request includes a location at which to listen for file changes.

6. The computer-implemented method of claim 5, wherein the location at which to listen for file changes is different than the location of the binary executable file.

7. The computer-implemented method of claim 1, wherein the at least one file change includes a new or updated configuration file used by the application.

8. The computer-implemented method of claim 1, wherein a first file change corresponds to a secure copying of a first file into the container during the first execution of the application.

9. A non-transitory, computer-readable medium storing one or more instructions executable by a computer system to perform operations comprising: receiving, by a container orchestrator process, a request to run an application in a container, wherein the container orchestrator process is a main process of the container;
   initiating, using an orchestrator proxy command and an application reference to the application, a first execution of the application, in the container, and as a first child process of the container orchestrator process;
   listening, by the container orchestrator process, for file changes for the application;
   determining at least one file change for the application;
   in response to determining the at least one file change for the application, initiating, using the orchestrator proxy command and the application reference to the application, a second execution of the application in the container, without restarting the container, using the at least one file change, and as a second child process of the container orchestration process, wherein the second child process is a different child process of the container orchestrator process than the first child process, wherein the container orchestrator process continues to execute during the file change; and after initiating the second execution of the application in the container, terminating the first child process.

10. The non-transitory, computer-readable medium of claim 9, wherein:

initiating the first execution of the application includes assigning the first child process to a first internal port and mapping an external port to the first internal port; and initiating the second execution of the application includes assigning the second child process to a second internal port and mapping the external port to the second internal port.

11. The non-transitory, computer-readable medium of claim 9, wherein the at least one file change includes a new version of a binary executable file for the application.

12. The non-transitory, computer-readable medium of claim 11, wherein the request includes a location of the binary executable file.

13. The non-transitory, computer-readable medium of claim 12, wherein the request includes a location at which to listen for file changes.

14. The non-transitory, computer-readable medium of claim 13, wherein the location at which to listen for file changes is different than the location of the binary executable file.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising: receiving, by a container orchestrator process, a request to run an application in a container, wherein the container orchestrator process is a main process of the container;

initiating, using an orchestrator proxy command and an application reference to the application, a first execution of the application, in the container, and as a first child process of the container orchestrator process;

listening, by the container orchestrator process, for file changes for the application;

determining at least one file change for the application;

in response to determining the at least one file change for the application, initiating, using the orchestrator proxy command and the application reference to the application, a second execution of the application in the container, without restarting the container, using the at least one file change, and as a second child process of the container orchestration process, wherein the second child process is a different child process of the container orchestrator process than the first child process, wherein the container orchestrator process continues to execute during the file change; and after initiating the second execution of the application in the container, terminating the first child process.

16. The computer-implemented system of claim 15, wherein:

initiating the first execution of the application includes assigning the first child process to a first internal port and mapping an external port to the first internal port; and initiating the second execution of the application includes assigning the second child process to a second internal port and mapping the external port to the second internal port.

17. The computer-implemented system of claim 15, wherein the at least one file change includes a new version of a binary executable file for the application.

18. The computer-implemented system of claim 17, wherein the request includes a location of the binary executable file.

19. The computer-implemented system of claim 18, wherein the request includes a location at which to listen for file changes.

20. The computer-implemented system of claim 19, wherein the location at which to listen for file changes is different than the location of the binary executable file.

* * * * *